United States Patent
Knake et al.

(10) Patent No.: US 10,685,415 B1
(45) Date of Patent: Jun. 16, 2020

(54) SYSTEMS AND METHODS FOR TRACKING INSTRUMENTS USEFUL FOR TRANSPORTING GOODS OF A BUSINESS

(71) Applicant: Sunrise R&D Holdings, LLC, Cincinnati, OH (US)

(72) Inventors: Keith Knake, Cincinnati, OH (US); Michael Scheafer, Liberty Township, OH (US); Dion Perkins, Blue Ash, OH (US); Brian Dwyer, Cincinnati, OH (US); Brad Waters, Cincinnati, OH (US)

(73) Assignee: SUNRISE R&D HOLDINGS, LLC, Cincinatti, OH (US)

( * ) Notice: Subject to any disclaimer, the term of this patent is extended or adjusted under 35 U.S.C. 154(b) by 0 days.

(21) Appl. No.: 16/269,127

(22) Filed: Feb. 6, 2019

(51) Int. Cl.
| | |
|---|---|
| *G08B 1/08* | (2006.01) |
| *G06Q 50/28* | (2012.01) |
| *G06K 7/10* | (2006.01) |
| *G06K 17/00* | (2006.01) |
| *G06K 19/07* | (2006.01) |
| *G06K 19/077* | (2006.01) |
| *H04W 4/80* | (2018.01) |
| *H04W 4/029* | (2018.01) |

(52) U.S. Cl.
CPC ......... *G06Q 50/28* (2013.01); *G06K 7/10297* (2013.01); *G06K 17/00* (2013.01); *G06K 19/0712* (2013.01); *G06K 19/0717* (2013.01); *G06K 19/07749* (2013.01); *H04W 4/029* (2018.02); *H04W 4/80* (2018.02)

(58) Field of Classification Search
CPC ............................. G06Q 50/28; G60K 17/00
USPC ................................ 340/539.1, 573.1, 573.4
See application file for complete search history.

(56) References Cited

U.S. PATENT DOCUMENTS

| | | | | |
|---|---|---|---|---|
| 5,920,287 | A * | 7/1999 | Belcher | G01S 5/021 342/450 |
| 7,701,334 | B1 * | 4/2010 | Perkins | G06Q 10/06 340/539.13 |
| 9,712,893 | B2 * | 7/2017 | Warkentin | H04Q 9/00 |
| 2010/0253519 | A1 * | 10/2010 | Brackmann | G01S 19/35 340/572.1 |
| 2011/0042452 | A1 * | 2/2011 | Cormack | B65D 1/22 235/375 |

* cited by examiner

*Primary Examiner* — Tai T Nguyen
(74) *Attorney, Agent, or Firm* — Stites & Harbison, PLLC; Terry L. Wright

(57) ABSTRACT

A system and method for tracking a milk crate, a bread tray, or other instrument for transporting goods of a business makes use of an electronic tracking tag attached to the milk crate, the bread tray, or other transport instrument. The electronic tracking tag includes a microprocessor and a transceiver, and wirelessly transmits an identifying electronic transmission at predetermined time intervals. The systems and methods further make use of a wireless network including a plurality of nodes, where each of the nodes is positioned at a predetermined location and receives the identifying electronic transmission from the electronic tracking tag upon movement of the electronic tracking tag into proximity with a node. Each of the nodes are then connected to a central computer server that identifies a location of the electronic tracking tag based on the predetermined location of the node.

16 Claims, 3 Drawing Sheets

SYSTEMS AND METHODS FOR TRACKING INSTRUMENTS USEFUL FOR TRANSPORTING GOODS OF A BUSINESS

TECHNICAL FIELD

The present invention relates to systems and methods for tracking instruments useful for transporting goods of a business. In particular, certain embodiments of the present invention relate to systems and methods for tracking instruments useful for transporting goods of a business that make use of electronic tracking tags that transmit identifying information to a node in a wireless network upon movement of the electronic tracking tag into proximity with the node.

BACKGROUND

Instruments that are used to transport goods, such as pallets, carts, totes, and the like, are frequently stolen or damaged during their use in transporting goods from one location to another. For example, the bakery and dairy manufacturing industries frequently report a high theft rate of plastic bread trays and milk crates, which are often taken to recyclers or grinding facilities where they are sold for further processing or recycling. Such theft then prevents not only the ability to recover those assets, but the transportable nature of those instruments also makes it particularly difficult to identify the parties involved in the theft. Accordingly, systems and methods for tracking such instruments that allow for the tracking of those instruments during transport would be both highly desirable and beneficial.

SUMMARY

The present invention includes systems and methods for tracking instruments useful for transporting goods of a business. In particular, certain embodiments of the present invention relate to systems and methods for tracking instruments useful for transporting goods of a business that make use of electronic tracking tags that transmit identifying information to a node in a wireless network upon movement of the electronic tracking tag into proximity with the node.

In one exemplary embodiment of the present invention, a system for tracking an instrument for transporting goods of a business first comprises an instrument for transporting goods. In certain embodiments, the instrument is a milk crate, a bread tray, a pallet, a tote, or a cart, such as a grocery cart. An electronic tracking tag is then attached to the instrument and includes a microprocessor and a transceiver, such that the electronic tracking tag is configured to wirelessly transmit an identifying electronic transmission at predetermined time intervals.

The system further makes use of and includes a wireless network including a plurality of nodes. Each of the plurality of nodes in the wireless network is positioned at a predetermined location and is configured to receive the identifying electronic transmission from the electronic tracking tag upon movement of the electronic tracking tag into proximity with a particular one of the plurality of nodes. Each of the plurality of nodes is then, in turn, connected to a central computer server that is configured to identify a location of the electronic tracking tag based on the predetermined location of each of the plurality of nodes.

In use, to track the location of the electronic tracking tags and corresponding instrument, the electronic tracking tag attached to the instrument is initially activated and is made to begin wirelessly transmitting an identifying electronic transmission from the electronic tracking tag at predetermined time intervals. As the instrument and the electronic tracking tag move through a supply chain, the identifying electronic transmissions are then received by particular ones of the plurality of nodes in the wireless network upon movement of the electronic tracking tag into proximity with the particular one of the plurality of nodes. The nodes then, in turn, communicate the receipt of the identifying electronic transmission to the central computer server to thereby identify the electronic tracking tag as being located at a particular location in the supply chain, such as the initial manufacturing facility. In this way, as the electronic tracking tag moves through a supply chain, e.g., from a manufacturing facility on to a distribution facility and, ultimately, to a retail store, the nodes positioned at those respective facilities receive the identifying electronic transmissions from the electronic tracking tag as the electronic tracking tag moves into proximity with those nodes. As such, not only is the central computer server able to record the location of the electronic tracking tag and, consequently, the instrument being used to ship the particular goods throughout the entire supply chain, but, should the instrument be stolen, the collected location points can then be mapped and used to identify where in the supply chain the theft occurred.

Further features and advantages of the present invention will become evident to those of ordinary skill in the art after a study of the description, figures, and non-limiting examples in this document.

DESCRIPTION OF EXEMPLARY EMBODIMENTS

The present invention includes systems and methods for tracking instruments useful for transporting goods of a business. In particular, certain embodiments of the present invention relate to systems and methods for tracking instruments useful for transporting goods of a business that make use of electronic tracking tags that transmit identifying information to a node in a wireless network upon movement of the electronic tracking tag into proximity with the node.

Figure 1:
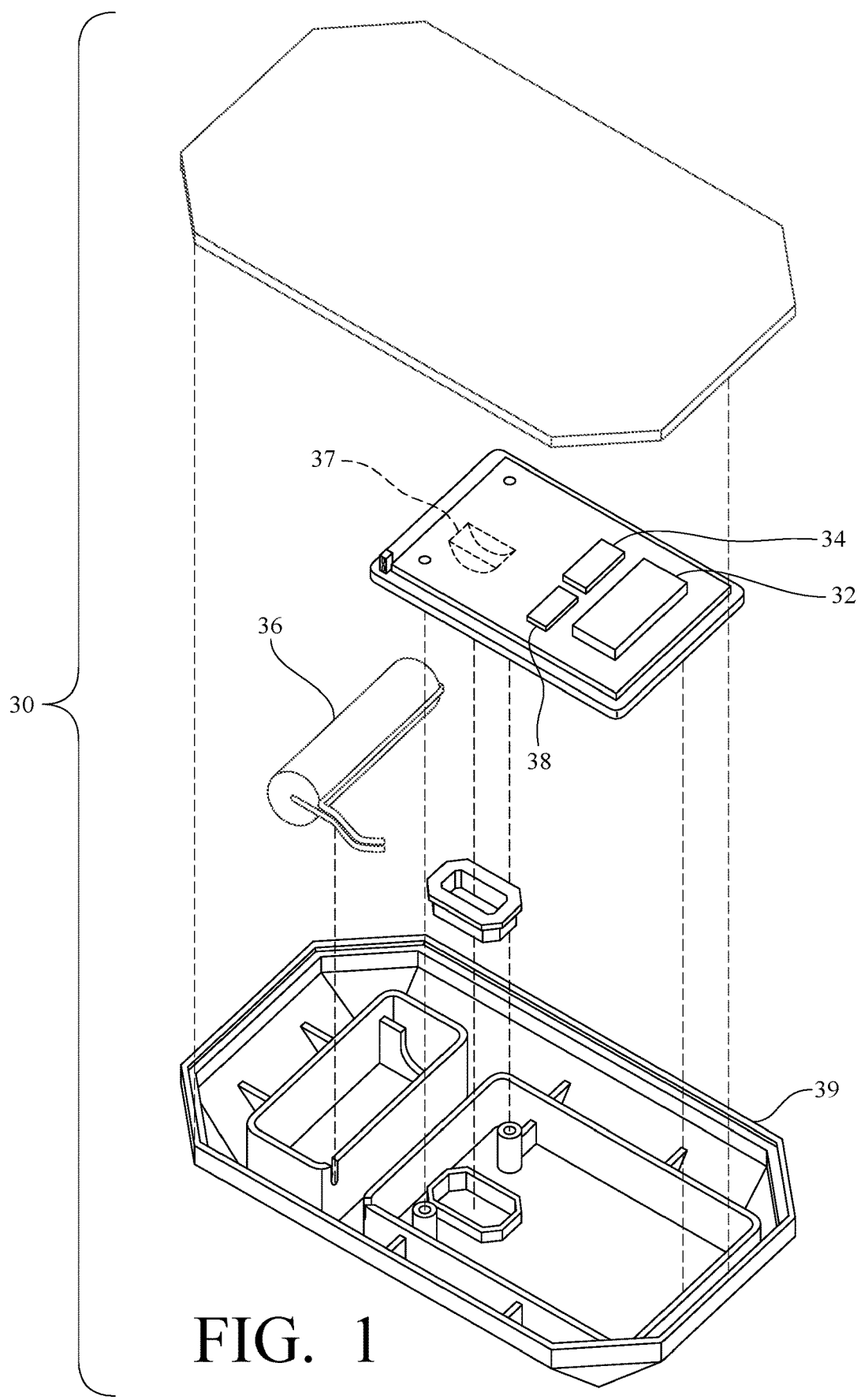
FIG. 1 is an exploded view of an electronic tracking tag made in accordance with the present invention.
Figure 2:
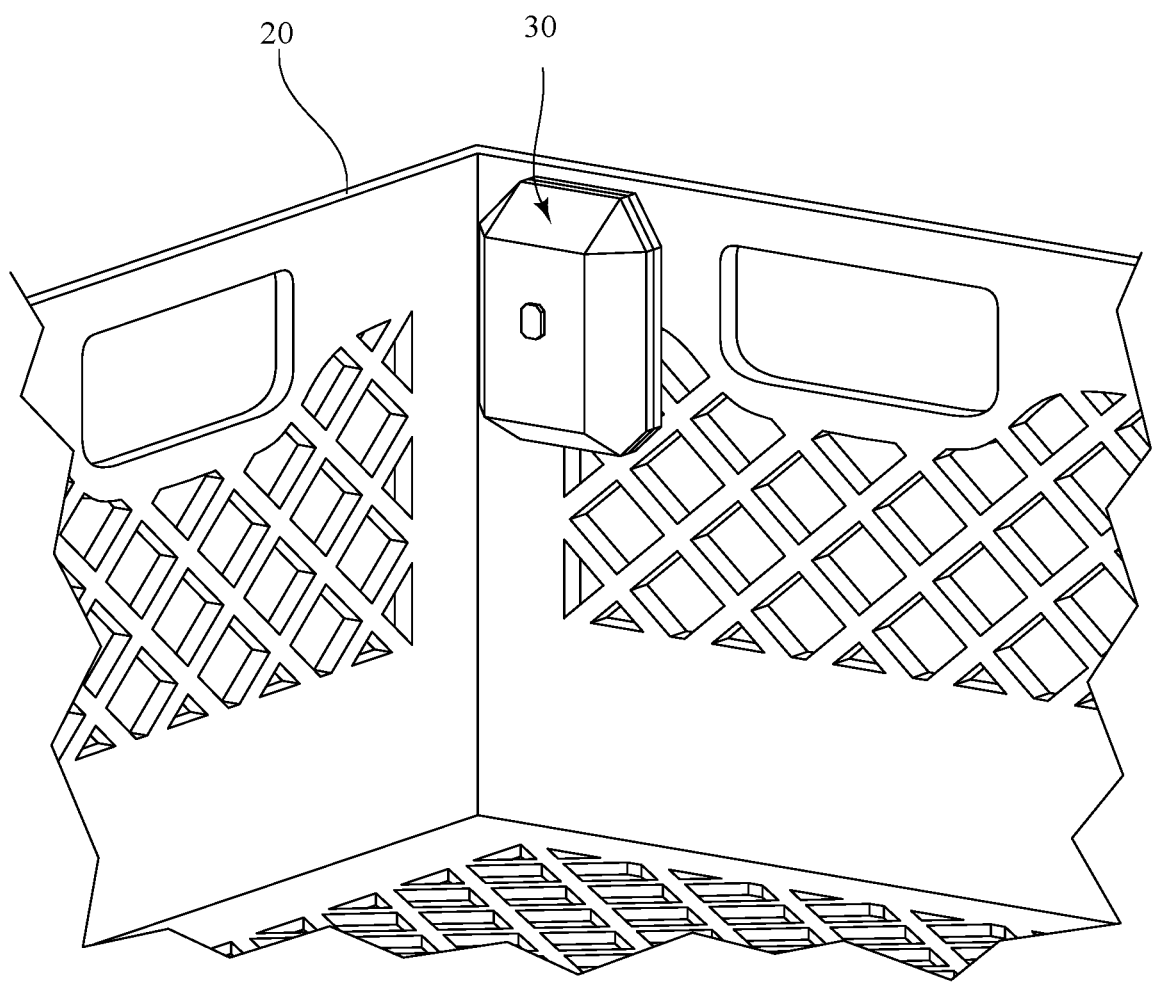
FIG. 2 is a perspective view of the electronic tracking tag of FIG. 1 attached to a milk crate in accordance with the present invention.

In one exemplary embodiment, and referring first to FIGS. 1 and 2, an exemplary system and method for tracking instruments useful for transporting goods of a business includes an electronic tracking tag 30 attached to a milk crate 20 that is commonly used to transport containers of milk from a manufacturing facility to a retail store, such as a grocery store. The electronic tracking tag 30 includes a microprocessor 32, a transceiver 34, and a battery 36, which are each housed in a moisture proof chamber 39 for sealing the electronic tracking tag 30 and preventing its internal components from being exposed to water and other elements from the environment that may otherwise damage the internal components of the electronic tracking tag 30 during use, as described further below.

The electronic tracking tag 30 and, more particularly, the transceiver 34 included in the electronic tracking tag 30 is configured to wirelessly transmit an identifying electronic transmission or signal at predetermined time intervals (e.g., every minute, every five minutes, every hour, etc.) upon activation of the electronic tracking tag 30, such that the identity of the particular electronic tracking tag 30 is continually being transmitted by the electronic tracking tag 30 at those particular time intervals. In this regard, and to avoid interference with existing wireless and physical networks, the transceiver 34 included in the electronic tracking tag 30 is typically configured to transmit a digital radio transmission as part of a ZIGBEE® wireless communication network (ZigBee Alliance Corporation, San Ramon, Calif.), which provides a low-data rate and low-power wireless personal area network based on the IEEE 802.15.4 standard. The electronic tracking tag 30, by making use of the ZIGBEE® architecture, thus minimizes the software and related components that are needed to transmit an identifying electronic transmission, but is further able to minimize the use of power from the battery 36 and provide an electronic tracking tag 30 capable of use for an extended period of time. Of course, for tracking applications requiring higher amounts of data transmission, it is contemplated that alternative wireless technologies, including Bluetooth technologies, can also be utilized without departing from the spirit and scope of the present invention.

Figure 3:
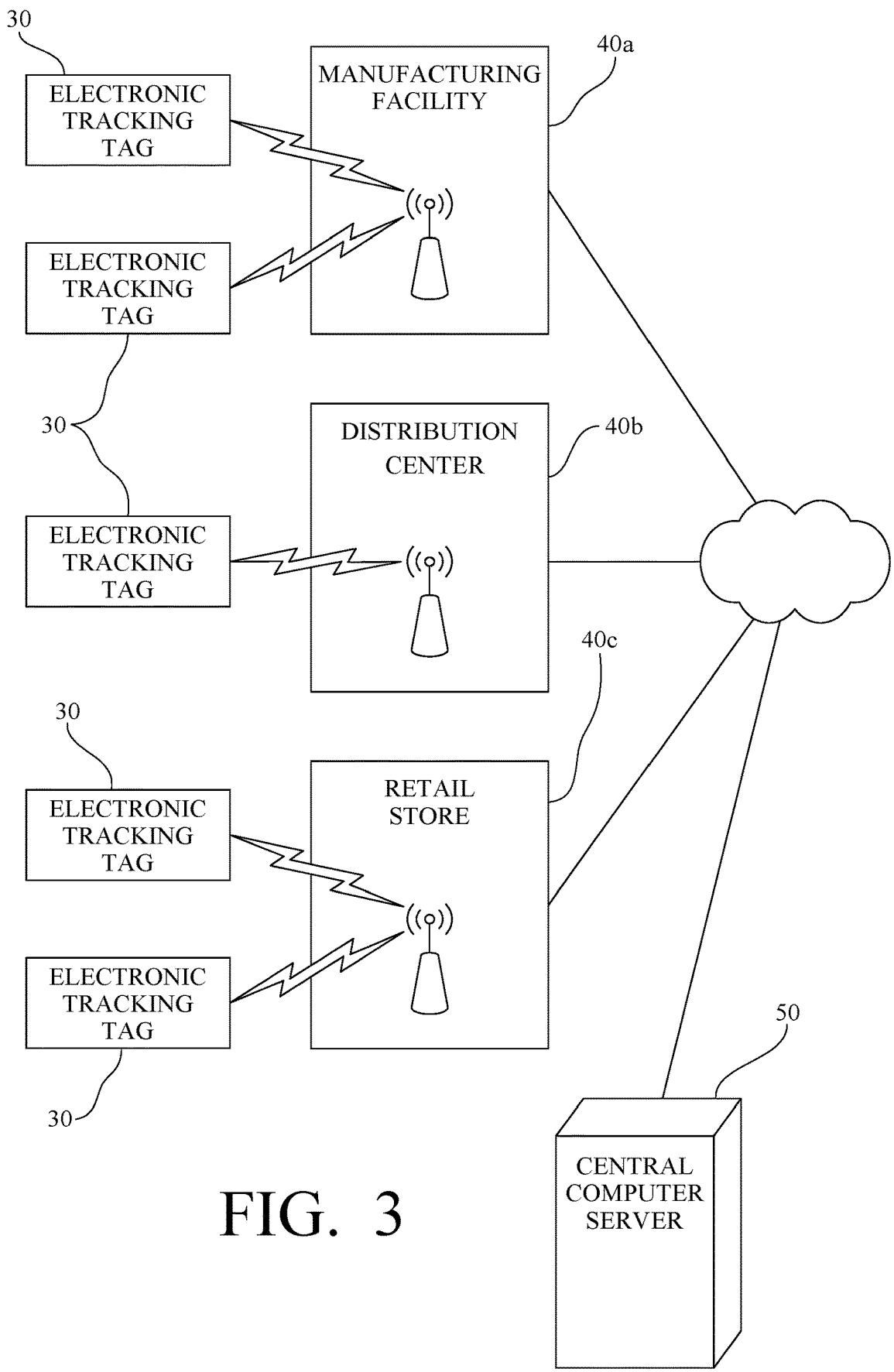
FIG. 3 is a schematic diagram showing an exemplary system for tracking instruments useful for transporting goods of a business in accordance with the present invention.

Referring now to FIG. 3, by making use of a ZIGBEE® network for transmitting the identifying electronic transmission, the electronic tracking tag 30 generally transmits the identifying electronic transmission over shorter distances of 10 to 100 meters and generally only includes a small amount of data to identify the particular electronic tag such that the identifying electronic transmission can also be characterized as an electronic "ping." In this way, and to identify a location of the electronic tracking tag 30 upon transmitting such an identifying electronic transmission, the systems described herein further include and make use of a wireless network comprised of a plurality of nodes 40a, 40b, 40c. Each of the nodes 40a, 40b, 40c are positioned at predetermined locations within the wireless network, as described further below, and are configured to receive the identifying electronic transmission from the electronic tracking tag 30 upon movement of the electronic tracking tag 30 into proximity (i.e., within 10-100 meters) of a particular one of the nodes. Each of the nodes 40a, 40b, 40c are then in further communication with a central computer server 50 that, given the known positioning of each of the nodes 40a, 40b, 40c in a predetermined location, is able to identify the location of the electronic tracking tag 30 upon receipt of a communication from a particular one of the nodes 40a, 40b, 40c that an electronic identifying transmission had been received from the electronic tracking tag at that particular node. Such communications between the central computer server 50 and each of the nodes 40a, 40b, 40c are generally facilitated through an internet connection, satellite communication, or other communications network or similar known means of data transport.

Referring again to FIGS. 1 and 2, as noted above, to activate the electronic tracking tag 30 and allow it to begin wirelessly transmitting an identifying electronic transmission, the electronic tracking tag 30 generally includes a motion sensor 37 configured to detect movement of the electronic tracking tag 30 and cause the electronic tracking tag 30 to become activated upon such movement. Of course, the electronic tracking tag 30 may also be configured to be turned on and off by manual or other means. However, by making use of a motion sensor 37 to activate the electronic tracking tag 30 only upon movement of the electronic tracking tag 30, the electronic tracking tag 30 is further configured to conserve power stored in the battery 36 when not in use.

To further increase the functionality of the electronic tracking tag 30, the electronic tracking tag 30 attached to the milk crate 20 shown in FIG. 2 further includes a temperature sensor 38 that measures a temperature of the environment surrounding the electronic tracking tag 30 at predetermined intervals (e.g., at the same predetermined time intervals at which the identifying electronic transmission is made). By measuring the temperature at such predetermined intervals, in applications where the temperature of goods being transported must be maintained, such as in transporting milk in the milk crate 20, the electronic tracking tag 30 can thus be used to record the temperature of the surrounding environment at predetermined time intervals during transport. Once the electronic tracking tag 30 is in proximity with one of the nodes 40a, 40b, 40c of the wireless network, the temperature data can then be transmitted to one of the nodes 40a, 40b, 40c and then on to the central computer server 50 such that the central computer server 50 receives the temperature data and can thereby monitor whether the milk was maintained at a suitable temperature throughout its transport. In this regard, while the electronic tracking tag 30 shown in FIGS. 1-2 includes and makes use of a motion sensor 37 and temperature sensor 38, it is further contemplated that other sensors, either in lieu of or in addition to the motion sensor 37 and temperature sensor 38, can also be incorporated into an electronic tracking tag of the present invention and can be selected depending on the particular application or goods being transported.

Referring again to FIG. 3, in use and subsequent to loading the particular goods on the milk crate or other instrument being used to transport the goods, the electronic tracking tag 30 is initially activated by either manually activating the electronic tracking tag 30 or by moving the electronic tracking tag 30 and causing its activation via the motion sensor 37 included in the electronic tracking tag 30. Upon activation, the electronic tracking tag 30 then begins wirelessly transmitting an identifying electronic transmission from the electronic tracking tag 30. Depending on the location of the electronic tracking tag 30, the identifying electronic transmission can then be received by one of the nodes of the wireless network that are positioned at predetermined locations throughout the supply chain associated with the particular good. For example, and with reference to FIG. 3, the electronic tracking tag 30 is typically activated while the electronic tracking tag 30 is initially present at the manufacturing facility associated with the particular good. Upon activation, the electronic tracking tag 30 then transmits an initial identifying electronic transmission that is received by a first node 40a at the manufacturing facility and that, in turn, communicates the receipt of the identifying electronic transmission to the central computer server 50 and thereby identifies the electronic tracking tag 30 as being located at the manufacturing facility.

Subsequently, as the electronic tracking tag 30 moves from the manufacturing facility on to a distribution facility and, ultimately, to a retail store, the nodes 40b, 40c positioned at those respective facilities then receive the identifying electronic transmissions from the electronic tracking tag 30 as the electronic tracking tag 30 moves into proximity with those nodes 40b, 40c. In this way, not only is central computer server 50 able to record the location of the electronic tracking tag 30 and, consequently, the instrument being used to ship the particular goods throughout the entire supply chain, but should the instrument be stolen, the collected location points can then be mapped and used to identify where in the supply chain the theft occurred. By identifying the location of such thefts, internal controls can then be implemented at that point in the supply chain to reduce further theft opportunities or to otherwise alter the behavior of employees at that point in the supply chain.

With respect to the instruments on which the electronic tacking tags are attached, as shown above, in some implementations, the electronic tracking tag is physically attached to a milk crate as such milk crates are frequently stolen during transport at a cost to the manufacturer or retailer. The electronic tracking tags of the present invention, however, are also particularly useful for other instruments that are commonly used for transporting goods of a business and which are routinely a target of theft, such as bread trays that are capable of being stacked upon one another. Of course, the use of the electronic tracking tags in accordance with the present invention is also not limited to milk crates and bread trays onto which an electronic tracking tag can be physically attached or embedded within, but is further inclusive of pallets, carts, totes, and the like that are each useful for transporting goods of a business, either within common supply chains or within particular retail stores.

For example, in a further implementation of the systems and methods of the present invention, the instrument is a grocery cart and an electronic tracking tag is attached directly to the grocery cart either by physically mounting the tag to the cart or embedding the electronic tracking tag within the grocery cart. The electronic tracking tag attached to the shopping cart can then be placed into communication with a plurality of nodes that are each present within and are part of a wireless network present in the retail store. In this way, as the electronic tracking tags transmit their identifying electronic transmission at predetermined intervals and those transmissions are received by the nodes within the store and transmitted to a central computer server, the location of the shopping carts within the store can be identified and used to map areas of high and low traffic within the grocery store.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

What is claimed is:

1. A system for tracking a milk crate or a bread tray, comprising:
    a milk crate or a bread tray;
    an electronic tracking tag attached to the milk crate or the bread tray, the electronic tracking tag including a microprocessor and a transceiver, the electronic tracking tag further including a motion sensor for activating the electronic tracking tag only upon movement of the milk crate or the bread tray, and the electronic tracking tag configured to wirelessly transmit an identifying electronic transmission at predetermined time intervals; and
    a wireless network including a plurality of nodes, each of the plurality of nodes positioned at a predetermined and separate location in a supply chain, each of the plurality of nodes configured to receive the identifying electronic transmission from the electronic tracking tag upon movement of the electronic tracking tag into proximity with a particular one of the plurality of nodes, and each of the plurality of nodes connected to a central computer server configured to identify a location of the electronic tracking tag based on the predetermined location of each of the plurality of nodes.

2. The system of claim 1, wherein the electronic tracking tag includes a temperature sensor for measuring a temperature of an environment surrounding the electronic tracking tag at each predetermined interval.

3. The system of claim 1, wherein the electronic tracking tag is physically mounted to or embedded in the milk crate or the bread tray.

4. The system of claim 1, wherein the electronic tracking tag is sealed in a moisture proof chamber.

5. The system of claim 1, wherein the identifying electronic transmission is a digital radio transmission.

6. A system for tracking an instrument for transporting goods of a business, comprising:
    an instrument for transporting goods;
    an electronic tracking tag attached to the instrument, the electronic tracking tag including a microprocessor and a transceiver, the electronic tracking tag further including a motion sensor for activating the electronic tracking tag only upon movement of the instrument, and the electronic tracking tag configured to wirelessly transmit an identifying electronic transmission at predetermined time intervals; and
    a wireless network including a plurality of nodes, each of the plurality of nodes positioned at a predetermined and separate location in a supply chain, each of the plurality of nodes configured to receive the identifying electronic transmission from the electronic tracking tag upon movement of the electronic tracking tag into proximity with a particular one of the plurality of nodes, and each of the plurality of nodes connected to a central computer server configured to identify a location of the electronic tracking tag based on the predetermined location of each of the plurality of nodes.

7. The system of claim 6, wherein the instrument is selected from a shipping pallet or a tote.

8. The system of claim 6, wherein the electronic tracking tag includes a temperature sensor for measuring a temperature of an environment surrounding the electronic tracking tag at each predetermined interval.

9. The system of claim 6, wherein the identifying electronic transmission is a digital radio transmission.

10. A method for tracking an instrument for transporting goods of a business, comprising:
    activating an electronic tracking tag attached to the instrument, the electronic tracking tag including a microprocessor and a transceiver, and the electronic tracking tag further comprising a motion sensor for detecting movement of the instrument such that activating the electronic tracking tag comprises the activating the electronic tracking tag only upon detection of movement of the instrument by the motion sensor;
    wirelessly transmitting an identifying electronic transmission from the electronic tracking tag at predetermined time intervals to one of a plurality of nodes in a wireless network, each one of the plurality nodes positioned at a predetermined and separate location in a supply chain, and each of the plurality of nodes configured to receive the identifying electronic transmission from the electronic tracking tag upon movement of the electronic tracking tag into proximity with a particular one of the plurality of nodes, and each one of the plurality of nodes connected to a central computer server configured to identify a location of the electronic tracking tag based on the predetermined location of the node.

11. The method of claim 10, wherein the instrument is a shipping pallet or a tote.

12. The method of claim 11, wherein each node in the wireless network is positioned at a predetermined location in a supply chain for a grocery store.

13. The method of claim 10, wherein the instrument is a bread tray or a milk crate.

14. The method of claim 10, wherein the electronic tracking tag further comprises a temperature sensor, and wherein the method further comprises a step of measuring and transmitting a temperature of an environment surrounding the electronic tracking tag at each predetermined interval.

15. The method of claim 10, wherein the identifying electronic transmission is a digital radio transmission.

16. The method of claim 10, wherein the predetermined location comprises a manufacturing facility, a distribution facility, a retail store, or combinations thereof.

* * * * *